United States Patent [19]

Ogawa et al.

[11] Patent Number: 4,481,327

[45] Date of Patent: Nov. 6, 1984

[54] RUBBER COMPOSITIONS COMPRISINING AN ALKADIENE SULFONE AN CARBON BLACK

[75] Inventors: Masaki Ogawa; Yasushi Hirata, both of Sayama; Akira Tsuchikura, Tokyo, all of Japan

[73] Assignee: Bridgestone Tire Company, Ltd., Tokyo, Japan

[21] Appl. No.: 454,292

[22] Filed: Dec. 29, 1982

[30] Foreign Application Priority Data

Jan. 19, 1982 [JP] Japan .................................... 57-5441

[51] Int. Cl.$^3$ .......................... C08K 3/04; C08K 5/41; B60C 3/00; B60C 5/08
[52] U.S. Cl. ............................. 524/432; 152/330 R; 152/353 R; 152/355; 524/435; 524/496; 524/534; 524/571; 525/291; 525/353
[58] Field of Search ............... 524/432, 534, 535, 435; 152/353 R, 355, 330 R

[56] References Cited

U.S. PATENT DOCUMENTS

| | | | |
|---|---|---|---|
| 3,326,868 | 6/1967 | Tucker | 526/304 |
| 3,837,993 | 9/1974 | Shimmel | 428/25 |
| 4,003,420 | 1/1977 | Sandstrom et al. | 152/353 R |
| 4,224,196 | 9/1980 | Gursky | 152/353 R |

OTHER PUBLICATIONS

Derwent Abs. 55810A/31 Bridgestone Tire KK J53072056.

*Primary Examiner*—Herbert J. Lilling
*Attorney, Agent, or Firm*—Sughrue, Mion, Zinn, Macpeak & Seas

[57] ABSTRACT

Rubber compositions having improved tensile strength, elongation and modulus of unvulcanized rubbers without deteriorating physical properties of vulcanized rubbers are prepared by utilizing synergistic effect of addition of a filler having high reinforcing property and alkadiene sulfones in given amounts to natural rubber and/or dienic synthetic rubbers.

2 Claims, No Drawings

RUBBER COMPOSITIONS COMPRISINING AN ALKADIENE SULFONE AN CARBON BLACK

BACKGROUND OF THE INVENTION

1. Field of the Invention

The present invention relates to novel rubber compositions in which tensile strength, elongation and modulus of unvulcanized rubber compositions (referred to as green strength, green elongation, green modulus hereinafter) are improved without deteriorating the physical properties of vulcanized rubbers.

2. Description of the Prior Art

The improvement of the green strength of rubber, particularly the improvement of the green strength of synthetic rubbers is an important problem in rubber processing industry and a large number of developments have been made.

For example, the formation of a relatively few networks in an unvulcanized state has been disclosed in U.S. Pat. Nos. 703,886 and 3,562,303 and the increase of the aggregating force has been disclosed in U.S. Pat. No. 4,131,653.

As a process for improving the green strength through ion bonding, it has been proposed that a monomer having a third amine group and a monomer having two or more halogen atoms are copolymerized when producing polymeric rubbers, to form a quaternary ammonium salt in unvulcanized state.

The improvement of the green strength by improving the crystallinity has been proposed in U.S. Pat. Nos. 4,048,427, 4,020,115, 3,951,936, 4,198,324, etc.

The improvement of the green strength through increase of the entanglement of high molecules has been disclosed in U.S. Pat. Nos. 3,868,344, 4,092,375, etc.

The improvement through block high molecules has been disclosed in U.S. Pat. Nos. 4,179,480, 4,168,286, 4,152,370, etc.

As means using additives, the following proposals have been made, that is addition of dibenzimidazolyl sulfides; p-nitroso-N-alkylamine or p-nitroso-N-alkylaniline; a hydrocarbon compound having one monothiocarboxyl group and one or more carboxyl groups or a sulfur-containing hydrocarbon compound; polyfunctional isocyanate or isothiocyanate; a resin consisting mainly of dicyclopentadiene; an aromatic polyamine or aromatic polynitroso compound; or an aromatic chlorine compound.

Among these prior arts, the practically used ones are addition of an agent for improving the green strength, such as N-(2-methyl-2-nitropropyl)-4-nitroso aniline, poly-p-dinitrosobenzene and tetrachlorobenzoquinone, etc. or irradiation of radiation, such as electron ray, etc.

The former is high in the toxicity of the chemicals and the use is difficult in view of health and the latter needs a high expense for installation.

Therefore, the development of a process for improving the green strength in which the toxicity is low, the treatment is easy and the physical properties of vulcanized rubbers are not deteriorated, has been demanded.

SUMMARY OF THE INVENTION

The inventors have paid attention to alkadiene sulfones having low toxicity used as a prior modifier of rubber and made diligent study and found that the green strength is noticeably improved by means of combined use of said compound and a filler having high reinforcing property and accomplished the present invention.

The present invention lies in rubber compositions having an improved green strength characterized in that to 100 parts by weight of natural rubber and/or a dienic synthetic rubber are added 20–70 parts by weight of a filler having high reinforcing property and no greater than 1.5 parts by weight of an alkadiene sulfone, which is 0.4–4% by weight of the filler.

DESCRIPTION OF THE PREFERRED EMBODIMENT

The dienic synthetic rubbers include synthetic polyisoprene rubber, styrene-butadiene copolymeric rubber, isoprene-butadiene copolymeric rubber, polybutadiene rubber, ethylene-propylene-diene ternary copolymeric rubber, acrylonitrile-butadiene copolymeric rubber, propylene-butadiene copolymeric rubber, isoprene-isobutylene copolymeric rubber, halogenated isoprene-isobutylene copolymeric rubber, etc.

The fillers having high reinforcing property mean the fillers which form a large amount of gel through kneading with a rubber component, for example, carbon black, anhydrous silicic acid, hydrated silicic acid.

Alkadiene sulfones according to the present invention include piperylene sulfone, 1,3-dimethylbutadiene sulfone, 2,3-dimethylbutadiene sulfone, 2,4-hexadiene sulfone, etc. and particularly butadiene sulfone and isoprene sulfone are commercially cheap and preferable.

It has been disclosed in Japanese Patent Laid-open Application No. 72,056/78, Rubber 7, 658 (1960) that alkadiene sulfones are used as an isomerizing agent which isomerizes a part of cis 1,4-structure in natural rubber or polyisoprene rubber into trans 1,4-structure when vulcanizing, restrains crystallization of rubber and improves the rupture strength of vulcanized rubber, and are added in an amount of 0.1–5 parts by weight based on 100 parts by weight of rubber. For this application, an amount of less than 0.1 parts by weight is small in the isomerized amount and cannot develop the effect.

While, in order to improve the green strength, which is an object of the present invention, it is essential to use no greater than 1.5 parts by weight.

When alkadiene sulfones are used in an amount of more than 1.5 parts by weight, the green strength is rather reduced and alkadiene sulfones remain even after vulcanization and are precipitated as needle crystal in rubber after a long time (several hundreds hours) and become a rupture nucleus of rubber, so that the fatigue rupture resistance is noticeably deteriorated and such an amount is not preferable. In an amount of no greater than 1.5 parts by weight, the precipitated amount is slight and the crystal is not grown, so that such an amount is very advantageous. In the present invention it is particularly surprising that the green strength, green elongation and green modulus can be noticeably improved by using an alkadiene sulfone together with a filler having high reinforcing property.

This effect can be commonly developed in the fillers which can produce a large amount of gel owing to kneading with a dienic rubber, such as furnace carbon black, channel carbon black and silica (hydrated silicic acid, anhydrous silicic acid) but the synergistic effect is not developed in the combined use of fillers which do not substantially form gel, such as hard clay, soft clay, magnesium carbonate, calcium carbonate, etc. Therefore, it is considered that the microstructure of the gel is highly varied due to addition of alkadiene sulfones or the ratio of the gel and the sole of rubber is varied.

When an amount of the fillers having high reinforcing property becomes less than 20 parts by weight, the effect of the combined use is noticeably reduced and when said amount exceeds 70 parts by weight, the effect of the combined use is not developed and this proves the above described fact.

An amount of alkadiene sulfones added for improving the green strength is preferably 0.4-4% by weight of the above described fillers.

When said amount is less than 0.4% by weight, the above described synergistic effect cannot be obtained, while when said amount exceeds 4% by weight, the effect for improving the green strength is rather lowered and as mentioned above, an excessive alkadiene sulfone is precipitated as needle crystal in rubber.

In the present invention, depending upon the object, in addition to the above described additives, use may be made of a vulcanizing agent, a vulcanization accelerator, an accelerator activator, a vulcanization retarder, an antioxidant, a softener, a plasticizer, a tackifier, a peptizing agent and the like which are usual additives.

For example, as the vulcanizing agent, use may be made of sulfur, sulfur chloride, 4,4'-dithio-bis-dimorphorine (Barnock R, made by Ohuchi Shinko Kagaku Kogyo Co., Ltd.), alkyl phenol polysulfide, etc. and the generally used range is 0.5-5 parts by weight.

As vulcanization accelerators, thiazole, sulfeneamide, thiocarbamate, guanidine, thiuram and aldehydeamine compounds are preferable.

As accelerator activators, use may be made of zinc white, fatty acids, such as stearic acid, resin acids and the like.

It is preferable to use zinc white in an amount of more than 3 parts by weight.

The present invention can be broadly applied in rubber industry and for example, can be used for belts, horses, rubber vibration isolators, fenders, tires and the like.

In tires, the present invention can be applied to belt coating rubber, ply coating rubber, tread (tread cap rubber), tread base, rubber chafer, sidewall rubber, inner liner rubber, stiffener belt undercushion rubber and the like.

In particular, when the present invention is applied to tread rubber (tread cap rubber and tread base rubber) and sidewall rubber, the uniformity of tires is improved, so that this application is particularly preferable.

The following examples are given for the purpose of illustration of this invention and are not intended as limitations thereof.

EXAMPLE 1

27 kinds of rubber compositions were prepared by kneading the components in the compounding ratios shown in following Tables 1 and 2 by means of Banbury mixer and then formed into sheets having a thickness of 4 mm through 10 inch roll and the formed sheets were punched by a circular brade having an outer diameter of 50 mm and an inner diameter of 40 mm and the obtained samples were measured with respect to green strength (yield stress), green elongation and green modulus in 150% elongation under stretch of 100 mm/min, by means of Instron tester. The obtained results are shown in Tables 1 and 2.

From Example sample Nos. 1-6, Comparative Example sample Nos. 1-12, it can be understood that the combined use of the filler having high reinforcing property and the alkadiene sulfone can develop the synergistic effect for improving the green strength, green elongation and green modulus.

TABLE 1(a)

| | Sample No. | | | | | | | | |
|---|---|---|---|---|---|---|---|---|---|
| | Comparative Example 1 | Comparative Example 2 | Example 1 | Example 2 | Example 3 | Comparative Example 3 | Comparative Example 4 | Example 4 | Example 5 |
| Naural rubber | 70 | 70 | 70 | 70 | 70 | 70 | 70 | 70 | 70 |
| Polybutadiene rubber (BR01) | 30 | 30 | 30 | 30 | 30 | 30 | 30 | 30 | 30 |
| Butadiene sulfone | — | 0.12 | 0.16 | 0.7 | 1.12 | 1.54 | 0.20 | 0.24 | 0.8 |
| Carbon black (HAF) | 35 | 35 | 35 | 35 | 35 | 35 | 55 | 55 | 55 |
| Aromatic oil | — | — | — | — | — | — | 7 | 7 | 7 |
| N—phenyl-N'—isopropyl-p-phenylenediamine | 1.0 | 1.0 | 1.0 | 1.0 | 1.0 | 1.0 | 1.0 | 1.0 | 1.0 |
| Stearic acid | 2.0 | 2.0 | 2.0 | 2.0 | 2.0 | 2.0 | 2.0 | 2.0 | 2.0 |
| Silica (Nipsil VN3) | — | — | — | — | — | — | — | — | — |
| Hard clay (Crown clay) | — | — | — | — | — | — | — | — | — |
| Magnesium carbonate | — | — | — | — | — | — | — | — | — |
| Calcium carbonate | — | 13 | — | — | — | — | — | — | — |
| ZnO | 4.0 | 4.0 | 4.0 | 4.0 | 4.0 | 4.0 | 4.0 | 4.0 | 4.0 |
| Mercaptobenzothiazole | 0.2 | 0.2 | 0.2 | 0.2 | 0.2 | 0.2 | 0.2 | 0.2 | 0.2 |
| 2-(4-morpholinodithio)benzothiazole | 0.75 | 0.75 | 0.75 | 0.75 | 0.75 | 0.75 | 0.75 | 0.75 | 0.75 |
| Sulfur | 2.0 | 2.0 | 2.0 | 2.0 | 2.0 | 2.0 | 2.0 | 2.0 | 2.0 |
| Weight % of butadiene sulfone based on filler | 0 | 0.34 | 0.46 | 2.0 | 3.3 | 4.4 | 0.36 | 0.44 | 1.45 |
| Green strength (kg/cm$^2$) | 2.1 | 2.5 | 3.8 | 5.3 | 3.9 | 2.3 | 2.5 | 4.6 | 5.6 |
| Green elongation (%) | 398 | 415 | 527 | 726 | 553 | 403 | 483 | 626 | 754 |
| Green modulus (kg/cm$^2$) | 1.12 | 1.16 | 1.34 | 1.39 | 1.27 | 1.19 | 1.32 | 1.33 | 1.95 |

TABLE 1(b)

| | Sample No. | | | | | | | | |
|---|---|---|---|---|---|---|---|---|---|
| | Comparative Example 5 | Comparative Example 6 | Comparative Example 7 | Example 6 | Comparative Example 8 | Comparative Example 9 | Comparative Example 10 | Comparative Example 11 | Comparative Example 12 |
| Natural rubber | 70 | 70 | 70 | 70 | 70 | 70 | 70 | 70 | 70 |

TABLE 1(b)-continued

| | Comparative Example 5 | Comparative Example 6 | Comparative Example 7 | Example 6 | Comparative Example 8 | Comparative Example 9 | Comparative Example 10 | Comparative Example 11 | Comparative Example 12 |
|---|---|---|---|---|---|---|---|---|---|
| Polybutadiene rubber (BR01) | 30 | 30 | 30 | 30 | 30 | 30 | 30 | 30 | 30 |
| Butadiene sulfone | 1.6 | 2.0 | 2.42 | 0.7 | 0.7 | 0.7 | 0.7 | 0.7 | — |
| Carbon black (HAF) | 55 | 55 | 55 | 15 | 15 | 15 | 15 | — | 15 |
| Aromatic oil | 7 | 7 | 7 | — | — | — | — | — | — |
| N—phenyl-N'—isopropyl-p-phenylenediamine | 1.0 | 1.0 | 1.0 | 1.0 | 1.0 | 1.0 | 1.0 | 1.0 | 1.0 |
| Stearic acid | 2.0 | 2.0 | 2.0 | 2.0 | 2.0 | 2.0 | 2.0 | 2.0 | 2.0 |
| Silica (Nipsil VN3) | — | — | — | 20 | — | — | — | — | — |
| Hard clay (Crown clay) | — | — | — | — | 20 | — | — | 35 | 20 |
| Magnesium carbonate | — | — | — | — | — | 20 | — | — | — |
| Calcium carbonate | — | — | — | — | — | — | 20 | — | — |
| ZnO | 4.0 | 4.0 | 4.0 | 4.0 | 4.0 | 4.0 | 4.0 | 4.0 | 4.0 |
| Mercaptobenzothiazole | 0.2 | 0.2 | 0.2 | 0.2 | 0.2 | 0.2 | 0.2 | 0.2 | 0.2 |
| 2-(4-morpholinodithio)benzothiazole | 0.75 | 0.75 | 0.75 | 0.75 | 0.75 | 0.75 | 0.75 | 0.75 | 0.75 |
| Sulfur | 2.0 | 2.0 | 2.0 | 2.0 | 2.0 | 2.0 | 2.0 | 2.0 | 2.0 |
| Weight % of butadiene sulfone based on filler | 2.91 | 3.64 | 4.4 | 2.0 | 2.0 | 2.0 | 2.0 | 2.0 | 2.0 |
| Green strength (kg/cm$^2$) | 7.2 | 5.1 | 4.0 | 4.5 | 1.8 | 1.7 | 1.5 | 0.9 | 1.7 |
| Green elongation (%) | 789 | 630 | 521 | 783 | 385 | 351 | 428 | 311 | 357 |
| Green modulus (kg/cm$^2$) | 1.87 | 1.64 | 1.45 | 1.30 | 0.97 | 0.91 | 0.78 | 0.61 | 0.93 |

TABLE 2

| | Comparative Example 13 | Example 7 | Example 8 | Example 9 | Comparative Example 14 | Comparative Example 15 | Example 10 | Comparative Example 16 | Example 11 |
|---|---|---|---|---|---|---|---|---|---|
| Natural rubber | 50 | 50 | 50 | 50 | 50 | 100 | 100 | 100 | 100 |
| Polybutadiene rubber (BR01) | 20 | 20 | 20 | 20 | 20 | — | — | — | — |
| Polyisoprene rubber (IR2200) | 10 | 10 | 10 | 10 | 10 | — | — | — | — |
| Styrene-butadiene copolymer rubber (SBR1500) | 20 | 20 | 20 | 20 | 20 | — | — | — | — |
| Carbon black (SAF) | 18 | 25 | 40 | 65 | 75 | — | — | 40 | 40 |
| Silica (Nipsil VN3) | — | — | — | — | — | 30 | 30 | — | — |
| Butadiene sulfone | 0.18 | 0.25 | 0.40 | 0.65 | 0.75 | — | 0.15 | — | — |
| Isoprene sulfone | — | — | — | — | — | — | 0.15 | — | 0.40 |
| Aromatic oil | 5 | 5 | 5 | 5 | 5 | 5 | 5 | 5 | 5 |
| N—phenyl-N'—isopropyl-p-phenylenediamine | 1.0 | 1.0 | 1.0 | 1.0 | 1.0 | 1.0 | 1.0 | 1.0 | 1.0 |
| Stearic acid | 2.0 | 2.0 | 2.0 | 2.0 | 2.0 | 2.0 | 2.0 | 2.0 | 2.0 |
| ZnO | 4.0 | 4.0 | 4.0 | 4.0 | 4.0 | 4.0 | 4.0 | 4.0 | 4.0 |
| Mercaptobenzothiazole | 0.2 | 0.2 | 0.2 | 0.2 | 0.2 | — | — | — | — |
| 2-(4-morpholinodithio)benzothiazole | 0.8 | 0.8 | 0.8 | 0.8 | 0.8 | 0.6 | 0.6 | 0.5 | 0.5 |
| Sulfur | 1.75 | 1.75 | 1.75 | 1.75 | 1.75 | 2.0 | 2.0 | 2.0 | 2.0 |
| Weight % of alkadiene sulfone based on filler | 1.0 | 1.0 | 1.0 | 1.0 | 1.0 | 0 | 1.0 | 0 | 1.0 |
| Green strength (kg/cm$^2$) | 3.6 | 4.9 | 6.1 | 6.5 | 6.5 | 3.4 | 7.6 | 3.1 | 7.3 |
| Green elongation (%) | 511 | 641 | 613 | 567 | 446 | 598 | 982 | 518 | 812 |
| Green modulus (kg/cm$^2$) | 1.30 | 1.62 | 1.73 | 2.17 | 2.45 | 1.61 | 1.99 | 1.95 | 2.34 |

The rubber compositions of Comparative Example sample No. 4, Example sample No. 4, Example sample No. 5, Comparative Example sample No. 5, Comparative Example sample No. 6 and Comparative Example sample No. 7 shown in Table 1 and Comparative Example sample No. 17 shown in the following Table 3 were vulcanized under a high pressure press at 145° C. for 40 minutes and left to stand for 240 hours and then subjected to JIS K 6301 bending test without forming original cut.

A number of bending time until the original crack was determined with respect to the respective sample and an index is shown by the following formula.

$$\frac{\text{Number of bending time of the test sample}}{\text{Number of bending time of Comparative Example sample No. 17}} \times 100$$

The higher index shows the better result.

The indexes of Comparative Example sample No. 4, Example sample No. 4, Example sample No. 5 are 101, 102 and 100 respectively and the deterioration of the fatigue rupture resistance due to needle crystallization of butadiene sulfone is not found but the indexes of Comparative Example sample No. 5, Comparative Example sample No. 6 and Comparative Example sample No. 7 are as very low as 76, 31 and 23 respectively and when the amount of butadiene sulfone added exceeds 1.5 parts by weight, it has been confirmed that said compound is precipitated as needle crystal in rubber and forms a breaking nucleus of rubber.

TABLE 3

| Comparative Example 17 | |
|---|---|
| Natural rubber | 70 |
| Polybutadiene (BR01) | 30 |
| Carbon black (HAF) | 55 |
| Aromatic oil | 7 |

TABLE 3-continued

| Comparative Example 17 | |
|---|---|
| N—phenyl-N'—isopropyl-p-phenylenediamine | 1.0 |
| Stearic acid | 2.0 |
| ZnO | 4.0 |
| Mercaptobenzothiazole | 0.2 |
| 2-(4-morphorinodithio)benzothiazole | 0.75 |
| Sulfur | 2.0 |

Comparative Example sample Nos. 13 and 14 and Example sample Nos. 7-9 in Table 2 show that the amount of the above described fillers is preferred to be 20-70 parts by weight.

When the amount exceeds 70 parts by weight, the green elongation is deteriorated owing to the combined use of alkadiene sulfone, so that the green strength cannot be improved.

Comparative Example sample Nos. 15 and 16 and Example sample Nos. 10 and 11 confirm that isoprene sulfone also shows the desirable synergistic effect.

EXAMPLE 2

Seven kinds of radial tires (size 165 SR 13, 4 ply) for passenger car which are provided with tread cap rubbers having rubber compositions shown in the following Table 4, tread base rubbers having rubber compositions shown in the following Table 5 and sidewall rubbers having rubber compositions shown in the following Table 6 were prepared. The green strength of each of unvulcanized rubber compositions was measured in the same manner as described in Example 1.

TABLE 4

| | Tire No. | | | | | | |
|---|---|---|---|---|---|---|---|
| | 1 | 2 | 3 | 4 | 5 | 6 | 7 |
| Styrene-butadiene copolymer rubber *1 | 100 | 100 | 100 | 100 | 100 | 100 | 100 |
| Carbon black ISAF | 65 | 65 | 65 | 65 | 65 | 65 | 65 |
| Aromatic oil | 40 | 40 | 40 | 40 | 40 | 40 | 40 |
| N—phenyl-N'—isopropyl-p-phenylenediamine | 2.0 | 2.0 | 2.0 | 2.0 | 2.0 | 2.0 | 2.0 |
| Stearic acid | 2.0 | 2.0 | 2.0 | 2.0 | 2.0 | 2.0 | 2.0 |
| Paraffin wax | 1.0 | 1.0 | 1.0 | 1.0 | 1.0 | 1.0 | 1.0 |
| Butadiene sulfone | — | 0.2 | 0.3 | 1.0 | 1.4 | 1.6 | 2.5 |
| ZnO | 1.8 | 1.8 | 1.8 | 1.8 | 1.8 | 1.8 | 1.8 |
| Tetramethylthiuram monosulfide | 4.0 | 4.0 | 4.0 | 4.0 | 4.0 | 4.0 | 4.0 |
| Sulfur | 1.5 | 1.5 | 1.5 | 1.5 | 1.5 | 1.5 | 1.5 |
| Weight % of butadiene sulfone based on carbon black | 0 | 0.31 | 0.46 | 1.54 | 2.15 | 2.46 | 3.85 |
| Green strength (kg/cm$^2$) | 2.6 | 3.1 | 4.9 | 5.6 | 4.6 | 3.3 | 2.5 |

*1: Emulsion polymerized SBR having styrene content of 35% by weight.

TABLE 5

| | Tire No. | | | | | | |
|---|---|---|---|---|---|---|---|
| | 1 | 2 | 3 | 4 | 5 | 6 | 7 |
| Natural rubber | 70 | 70 | 70 | 70 | 70 | 70 | 70 |
| BR01 made by Japan Sunthetic Rubber Co., Ltd. | 30 | 30 | 30 | 30 | 30 | 30 | 30 |
| Carbon black HAF | 35 | 35 | 35 | 35 | 35 | 35 | 35 |
| N—phenyl-N'—isopropyl-p-phenylenediamine | 1 | 1 | 1 | 1 | 1 | 1 | 1 |
| Stearic acid | 2 | 2 | 2 | 2 | 2 | 2 | 2 |
| ZnO | 3 | 3 | 3 | 3 | 3 | 3 | 3 |
| N—oxydiethylene-2-benzothiazole sulfenamide | 0.7 | 0.7 | 0.7 | 0.7 | 0.7 | 0.7 | 0.7 |
| Sulfur | 2.0 | 2.0 | 2.0 | 2.0 | 2.0 | 2.0 | 2.0 |
| Butadiene sulfone | — | 0.1 | 0.2 | 0.6 | 1.0 | 1.6 | 2.0 |
| Weight % of butadiene sulfone based on carbon black | 0 | 0.29 | 0.57 | 1.71 | 2.86 | 4.57 | 5.71 |
| Green strength (kg/cm$^2$) | 2.2 | 2.4 | 3.9 | 4.9 | 3.7 | 2.6 | 2.1 |

TABLE 6

| | Tire No. | | | | | | |
|---|---|---|---|---|---|---|---|
| | 1 | 2 | 3 | 4 | 5 | 6 | 7 |
| Natural rubber | 50 | 50 | 50 | 50 | 50 | 50 | 50 |
| BRO1 made by Japan Sunthetic Rubber Co., Ltd. | 50 | 50 | 50 | 50 | 50 | 50 | 50 |
| Carbon black FEF | 35 | 35 | 35 | 35 | 35 | 35 | 35 |
| N—phenyl-N'—isopropyl-p-phenylenediamine | 2 | 2 | 2 | 2 | 2 | 2 | 2 |
| Stearic acid | 2 | 2 | 2 | 2 | 2 | 2 | 2 |
| ZnO | 3 | 3 | 3 | 3 | 3 | 3 | 3 |
| Dibenzothiazyl disulfide | 0.2 | 0.2 | 0.2 | 0.2 | 0.2 | 0.2 | 0.2 |
| N—oxydiethylene-2-benzothiazole sulfenamide | 0.8 | 0.8 | 0.8 | 0.8 | 0.8 | 0.8 | 0.8 |
| Sulfur | 1.5 | 1.5 | 1.5 | 1.5 | 1.5 | 1.5 | 1.5 |
| Butadiene sulfone | — | 0.1 | 0.2 | 0.6 | 1.0 | 1.6 | 2.0 |
| Naphthenic oil | 10 | 10 | 10 | 10 | 10 | 10 | 10 |
| Paraffin wax | 1.0 | 1.0 | 1.0 | 1.0 | 1.0 | 1.0 | 1.0 |
| Weight % of butadiene sulfone based on carbon black | 0 | 0.29 | 0.57 | 1.71 | 2.86 | 4.57 | 5.71 |
| Green strength (kg/cm$^2$) | 1.7 | 2.0 | 3.1 | 3.6 | 3.0 | 1.9 | 1.7 |

Any of the tread cap rubber in Table 4, the tread base rubber in Table 5 and the sidewall rubber in Table 6, which were used in tire Nos. 3, 4 and 5, were high in the green strength and good in the molding processability of green tires.

Furthermore, the uniformity (uniformity of weight, internal toughness and size) of the seven kinds of tires was measured. The measuring method was followed to JASOC607 and an apparatus in which the tires are applied to a road wheel having a diameter of 854.1 mm and driven, was used. Radial force variation (RFV: variation of force of radial direction of tire) and lateral force variation (LFV: variation of force of lateral direction of tire) were measured under the conditions that all alignments of camber angle, slip angle and caster angle of tire are zero, inner pressure of tire is 1.7 kg/cm², load is JIS 50% and rotation rate is 10 rpm.

The results are shown in index by the following formulae.

$$RFV \text{ index} = \frac{\text{Maximum value of variation of force of radial direction of tire No. 1}}{\text{Maximum value of variation of force of radial direction of tire to be tested}} \times 100$$

$$LFV \text{ index} = \frac{\text{Maximum value of variation of force of lateral direction of tire No. 1}}{\text{Maximum value of variation of force of lateral direction of tire to be tested}} \times 100$$

The term "maximum value of variation of force" used herein means average value of ten rotations of the maximum value when the tire was rotated one time.

The larger values of RFV index and LFV index show the better results and the results are shown in Table 7.

TABLE 7

| Uniformity | Tire No. | | | | | | |
|---|---|---|---|---|---|---|---|
| | 1 Comparative Example | 2 Comparative Example | 3 Example | 4 Example | 5 Example | 6 Comparative Example | 7 Comparative Example |
| RFV index | 100 | 103 | 116 | 127 | 119 | 104 | 99 |
| LFV index | 100 | 104 | 119 | 125 | 120 | 106 | 100 |

As seen from the above table, the uniformity of Example tire Nos. 3, 4 and 5 is higher than that of Comparative Example Nos. 1, 2, 6 and 7 and it can be understood that when alkadiene sulfones are added to rubber compositions for tires which are low in the green strength and are easily deformed, the moldability is improved and the uniformity of tires is improved.

According to the present invention, rubber compositions which are low in toxicity, are cheap and have high green strength, can be obtained, the processability of unvulcanized rubbers is noticeably improved and the productivity of various rubber products is improved.

What is claimed is:

1. A pneumatic tire in which the tread rubber and the sidewall rubber are formed of a rubber composition comprising:
   (a) 100 parts by weight of at least one rubber selected from the group consisting of natural rubber and dienic synthetic rubbers;
   (b) 20–70 parts by weight of carbon black; and
   (c) not greater than 1.5 parts by weight of alkadiene sulfone, wherein the amount of said alkadiene sulfone based on said carbon black is 0.4–4% by weight.

2. The pneumatic tire of claim 1, wherein said rubber composition additionally comprises more than 3 parts by weight of zinc white.

* * * * *